Figure 1:
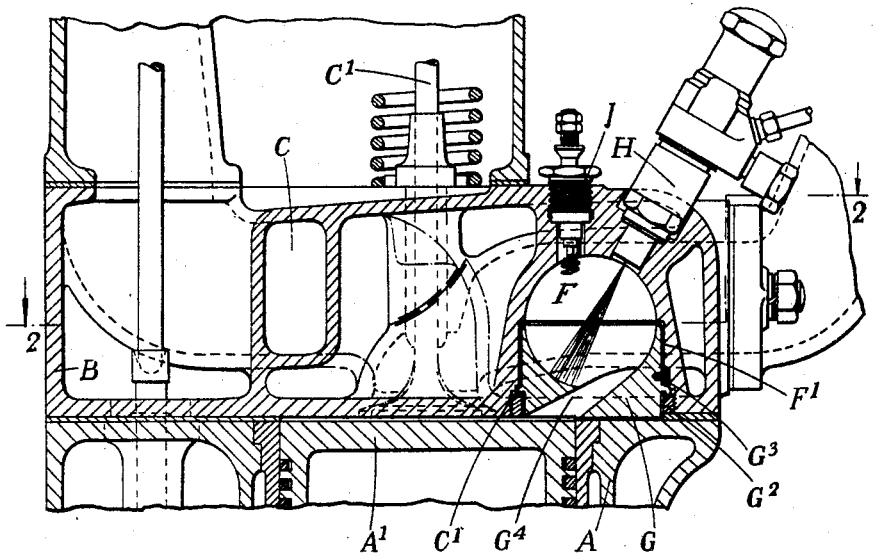

Patented June 4, 1935

2,003,311

UNITED STATES PATENT OFFICE 2,003,311

INTERNAL COMBUSTION ENGINE OF THE LIQUID FUEL INJECTION COMPRESSION IGNITION TYPE

Harry Ralph Ricardo, London, England

Application November 13, 1931, Serial No. 574,885
In Great Britain January 13, 1931

7 Claims. (Cl. 123—32)

This invention relates to internal combustion engines of the liquid fuel injection compression ignition type in which substantially the whole of the charge is forced during the compression stroke into a pocket constituting the combustion chamber, and has for its object to provide an improved engine which will be efficient and flexible in operation.

To this end an internal combustion engine of the above type according to the present invention conveniently comprises a water-cooled pocket formed in the cylinder head and constituting the combustion chamber which forms the major part of the combustion space, a plug which is disposed within the mouth of the combustion chamber pocket and so formed and arranged that it will tend to attain and be maintained at a high temperature during working of the engine, a restricted passage being so formed in the plug that at the end of the compression stroke the charge in the combustion chamber will be caused to be in a state of rotation as a whole, the circumferential portions of this rotating air charge sweeping across the inner end of the passage, and a fuel injection device adapted to deliver a jet of fuel toward a part of the hot surface across which the circumferential portion of the rotating air charge sweeps as it approaches the inner end of the passage. Conveniently, the formation of the pocket and of the inner end of the plug is such as to provide a combustion chamber which is of substantially circular or oval cross-section in planes which are parallel both to the axis of the plug and the axis of the restricted passage in the plug, the passage passing either obliquely through the plug or being formed by providing a groove in the circumferential surface of the plug so that the axis of the passage is substantially tangential with respect to the part of the wall of the combustion chamber adjacent to which its inner end lies, whereby rapid rotation of the charge tends to be set up by the entry of the air through the oblique passage, and this rotation tends to be maintained owing to the form of the combustion chamber.

In any case the fuel jet is preferably delivered toward a part of the inner surface of the plug lying as near to the edge of the inner end of the passage as is practicable while avoiding the direct injection of fuel into the passage. In this way the driving out through the passage of unburnt air which may lie between the inner end of the passage and the point at which the jet approaches the plug due to the combustion and expansion of the gases adjacent the plug wall is reduced or eliminated. In order to achieve this end it is generally desirable to employ a type of sprayer which will produce a concentrated cone of spray so that the area of the plug toward which the spray is directed is exactly determined.

The point in the combustion chamber wall at which the fuel injection device is situated may vary but conveniently it is so situated with relation to the part of the inner surface of the plug toward which the jet of fuel is directed that the axis of this jet passes through or adjacent to the axis of the combustion chamber and preferably, but not necessarily, obliquely with respect to the axis of the plug.

In a convenient arrangement the mouth of the pocket is of cylindrical form and its inner end is domed, while the plug is externally cylindrical and is formed concave at its inner end so that the interior of the combustion chamber is of substantially spherical or oval form, the plug fitting loosely within the mouth of the pocket so that the transference of heat from the plug to the cooled walls surrounding it is reduced and the plug is thus enabled to attain and be maintained at a high temperature during operation of the engine. Further, by reason of the loose fit of the plug heat-resisting metals of low heat conductivity which generally have high coefficients of expansion may be used for the plug while the water jacket of the pocket can be carried down to and around the mouth of this pocket in which the plug lies.

It will be appreciated that the present invention is not concerned with the detailed composition of the plug and it is obvious that the metal of which the plug is formed may vary over a wide range. In general a steel which is suitable for exhaust valves should be satisfactory for use in the plug. For instance, any heat-resisting steel having a high percentage of chromium combined with tungsten, nickel, or silicon to give the non-oxidizing properties at high temperatures is satisfactory as regards freedom from scaling. Silicon-chromium steels are not only highly resistive to scaling but are free from any tendency to split under the most drastic conditions of service. Furthermore, such steels give the required heat-resisting properties coupled with machinability and strength at high temperatures.

The form of the passage in the plug may vary but preferably the cross-sectional area of this passage is gradually reduced from its outer end towards its inner end, this passage either being of circular cross-section throughout its length or being formed for example of circular cross-section at its outer end and of other cross-section such as substantially crescent or kidney shape at its inner end, the cross-sectional area of the inner end in either case being preferably approximately three-fifths of that at its outer end.

The plug may either lie wholly over the cylinder bore or may lie partly to one side and overlap the cylinder bore and in the latter case the plug may be retained in place in the mouth of the pocket solely by reason of its lying partly to one side of the cylinder bore although a retaining ring may be provided, if desired, this ring serving primarily to maintain the plug in place in the mouth of the pocket during assembly or dismantling of the cylinder head. Such ring, however, may be found undesirable since it tends to increase the effective area of contact between the plug and the cooled wall surrounding it and thus to reduce the temperature attained by the plug.

It is a further object of the invention to provide a new and improved method of effecting combustion in an internal combustion engine of the liquid fuel injection compression ignition type.

Figure 2:
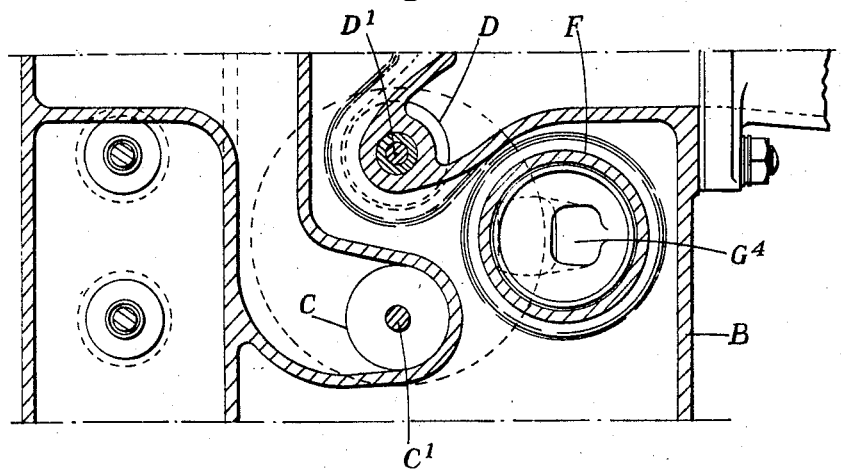
Figure 3:
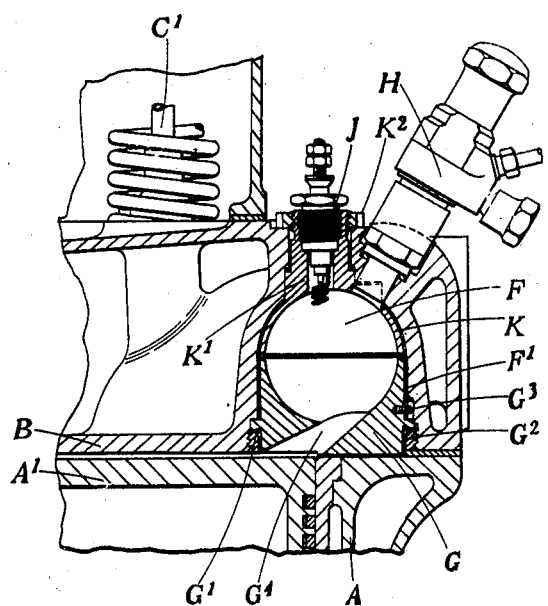

The invention may be carried into practice in various ways but one construction according to this invention is illustrated by way of example in the accompanying drawings, in which Figure 1 is a sectional side elevation, Figure 2 is a section on the line 2—2 of Figure 1, and Figure 3 is a similar view to Figure 1 of a modification of the invention.

In the construction illustrated in Figures 1 and 2 the engine comprises a cylinder A provided with a water-cooled cylinder head B to which the piston $A^1$ within the cylinder is adapted to approach closely at the end of the compression stroke.

Formed in the cylinder head B are inlet and exhaust ports C and D controlled by poppet valves $C^1$, $D^1$.

Also formed in the cylinder head is a water-cooled pocket F the mouth of which is of cylindrical form while its inner end is of domed or hemispherical form, as shown in Figure 1, the mouth of the pocket lying partly to one side of and partly overlapping the cylinder bore as shown. Loosely disposed within the cylindrical mouth of the pocket is an externally cylindrical plug G formed of heat-resisting material of low conductivity, the greater part of the exterior of this plug being of somewhat less diameter than the internal diameter of the cylindrical mouth of the pocket so that the wall of the plug is separated from the mouth of the pocket by a small air gap as indicated at $F^1$. The plug has formed on its outer circumferential surface a flange $G^1$ on which bears a retaining ring $G^2$ screwed into the mouth of the pocket. A set screw $G^3$ projects from the circumferential surface of the plug and engages a slot in the cylinder head so as to prevent rotation of the plug within the pocket.

The inner end of the plug is formed concave so as to provide a combustion chamber of substantially spherical form as shown and a passage $G^4$ passes obliquely through the plug from the part of the outer end of the plug which overlaps the cylinder bore, to the interior of the plug, this passage being substantially tangential with respect to the wall of the combustion chamber and being gradually reduced in diameter from its outer end towards its inner end. The shape of the passage when viewed in cross-section may be circular throughout its length or, for example, as indicated in Figure 2, while the cross-sectional area of the inner end of the passage is in either case preferably approximately three-fifths of that of its outer end.

Formed in the upper wall of the pocket is a socket for a fuel injection sprayer H adapted to deliver a single concentrated jet of fuel in such a direction that this fuel is directed toward the inner surface of the plug G at a point lying immediately to the left of the inner end of the passage $G^1$ in Figure 1, the part of the inner surface of this plug lying as near as is practicable to the inner end of the passage while avoiding direct injection of fuel into this passage. Also formed in the upper wall of the pocket is a second socket adapted to receive an electrical heater J of the hot wire type for starting purposes.

The operation of the engine is as follows. During operation of the engine the plug G by reason of the material of which it is formed and the small contact which it makes with the cooled walls of the pocket F attains and is maintained at a high temperature. During the compression stroke substantially the whole of the air charge is forced through the passage $G^4$ in the plug G into the pocket, the substantially tangential entry of the charge into the pocket causing the whole charge in the pocket to be in a state of rotation at the end of the compression stroke about an axis approximately at right angles to the plane in which lie the vertical axes of the pocket and of the cylinder bore so that the circumferential portion of the air charge as it rotates as a whole in the combustion chamber bore, sweeps across the inner end of the passage $G^4$. At or about the end of the compression stroke fuel is delivered through the sprayer H and this fuel is sprayed toward the part of the inner surface of the plug across which the circumferential portion of the rotating air charge sweeps substantially immediately before it reaches the inner end of the passage $G^4$. Thus by reason of the rotation of the air charge, the circumferential portions of this charge come progressively into contact with the fuel spray adjacent the plug so that the fuel and air are efficiently intermingled and burnt. Further the tendency for unburnt air to be driven out through the passage $G^4$ with a consequent loss of air available for combustion purposes is reduced or eliminated since any given part of the rotating air charge only comes into contact with the fuel spray immediately before such portion of the air charge reaches the inner end of the passage in the plug through which the charge during expansion passes to the cylinder bore. There is thus substantially no unburnt air between the part of the air charge being burnt with the fuel at any moment and the point at which the burnt gases leave the combustion chamber so that as the burning gases expand they can pass directly out of the combustion chamber without driving any unburnt air before them while substantially the whole of the air must come into contact with the fuel spray before leaving the combustion chamber.

In the construction shown it will be seen that the water-cooled jacket for the pocket extends down to and around the mouth of this pocket while the socket for the fuel sprayer passes through the water jacket so that this sprayer seating is also effectively cooled. Further the plug itself is free to expand and contract under temperature variations and is not subject to unbalanced combustion pressures.

In some cases the retaining ring $G^2$ may be omitted so as still further to reduce the effective area of contact between the plug and the cooled wall of the pocket and thus enable the plug to attain an even higher temperature, the plug being then retained in place solely by reason of its lying partly to one side of the cylinder bore.

In the modified construction illustrated in Figure 3 the construction is the same as that shown in Figures 1 and 2 except that the domed inner end of the pocket is provided with a liner K which lies adjacent to but is separated by a small air gap from the wall of the pocket and is conveniently formed of a heat-resisting metal of low heat conductivity. This liner absorbs heat during each combustion period and thus tends to heat up the next air charge compressed into the chamber.

This liner is conveniently supported by a boss $K^1$ formed integral therewith and disposed in and passing through a bore in the wall of the pocket, this boss being retained in place by a nut $K^2$ engaging its outer end. In the construction shown the boss is hollow and accommodates the hot wire heater J which may be employed to assist starting.

In the constructions shown the passage $G^4$ passes through the plug. In some cases, however, this passage may be formed by providing a groove in the circumference of the plug so that the passage is completed when the plug is in position by the adjacent cooled wall surrounding the plug. In this case it will be seen that the axis of the passage is still substantially tangential with respect to the wall of the combustion chamber but if such a construction is employed in the arrangement shown in the drawing the rotation of the charge within the combustion chamber would be in a substantially opposite direction from that in which it rotates in Figure 1. The point on the inner wall of the plug toward which the fuel jet is directed would preferably be, however, approximately the same as in the construction shown in Figure 1 and would thus lie at a point on the side of the inner end of the passage remote from the cylinder axis where the circumferential portion of the rotating air charge would sweep across it immediately before it reached the inner end of this passage.

With an engine according to this invention wherein the plug attains and is maintained at a high temperature during working of the engine, burning of the fuel and air begins substantially instantaneously at the beginning of the fuel injection period, whereby the rate of pressure rise can be controlled substantially throughout the whole fuel injection period by controlling the rate of injection. Thus by suitable control of the rate of injection smooth and flexible operation of the engine can be obtained.

It is to be understood that the form of the combustion chamber pocket and of the plug, the position of the fuel injection device for delivering fuel so that it will be sprayed toward the required part of the plug and other constructional details may be modified without departing from this invention.

What I claim as my invention and desire to secure by Letters Patent is:—

1. In an internal combustion engine of the liquid fuel injection type, the combination with a cylinder, of means defining a combustion chamber communicating with said cylinder and forming the major portion of the compression space at the end of the compression stroke, said means comprising a structure providing a pocket having a mouth and a heat retaining plug disposed within the mouth, said plug being provided with a passage therein of substantial length through which the entire volume of burning gas flows during the working stroke from the combustion chamber into the cylinder bore and through which substantially the entire air charge is delivered and during the compression stroke caused to sweep about the internal surfaces only of said pocket and plug, and a fuel injection device delivering a jet of fuel so directed as to project substantially the whole of the fuel charge toward and with sufficient velocity to cause particles of fuel which may be unburned to impinge on a portion of the heated internal surface of said plug lying adjacent the passage and swept over by the circulating charge as it approaches the passage.

2. In an internal combustion engine of the liquid fuel injection type, the combination with a cylinder, of means defining a combustion chamber communicating with said cylinder and forming the major portion of the compression space at the end of the compression stroke, said means comprising a structure providing a cooled pocket having a mouth and a heat resisting plug of low conductivity attaining a high temperature during operation of the engine and so supported in said mouth that there is no free flow of heat therefrom, said plug being provided with a passage therein of substantial length through which the entire volume of burning gases flows during the working stroke from the combustion chamber into the cylinder bore and through which substantially the entire air charge is delivered and caused to sweep about the internal surfaces only of said pocket and plug during the compression stroke, and a fuel injection device delivering a jet of fuel so directed as to project substantially the whole of the fuel charge toward and with sufficient velocity to cause particles of fuel which may be unburned to impinge on a portion of the heated internal surface of said plug lying adjacent the passage and swept over by the circulating charge as it approaches the passage.

3. In an internal combustion engine of the liquid fuel injection type, the combination with a cylinder, of means defining a combustion chamber communicating with said cylinder and forming the major portion of the compression space at the end of the compression stroke, said means comprising a structure providing a pocket having a mouth and a heat resisting plug of low conductivity disposed loosely within the mouth, said pocket and mouth being formed to provide generally rounded internal surfaces presenting a substantially closed curved path through which gases may be rotated, said plug being provided with a passage therein directed generally tangentially of the said curved path through which the entire volume of burning gas flows during the working stroke from the combustion chamber into the cylinder bore and through which substantially the entire air charge is delivered and caused to sweep about the internal surfaces only of said pocket and plug during the compression stroke, and a fuel injection device delivering a jet of fuel so directed as to project substantially the whole of the fuel charge toward and with sufficient velocity to cause particles of fuel which may be unburned to impinge on a portion of the heated internal surface of said plug lying adjacent the passage and swept over by the circulating charge as it approaches the passage.

4. In an internal combustion engine of the liquid fuel injection type, the combination with a cylinder, of means defining a combustion chamber communicating with said cylinder and forming the major portion of the compression space at the end of the compression stroke, said means comprising a structure providing a pocket having a mouth and a heat retaining plug disposed within the mouth, said pocket and plug providing together a substantially uninterrupted internal surface of generally spherical outline, said plug being provided with a passage therein of substantial length leading into said chamber in a direction generally tangential to the said internal surface through which the entire volume of burning gas flows during the working stroke from the combustion chamber into the cylinder bore and through which substantially the entire air charge is delivered and during the compression stroke caused to sweep about the generally spherical surface only of said pocket and plug, and a fuel injection device delivering a jet of fuel so directed as to project substantially the whole of the fuel charge toward and with sufficient velocity to cause particles of fuel which may be unburned to impinge on a portion of the heated internal surface of said plug lying adjacent the passage and swept over by the circulating charge as it approaches the passage.

5. In an internal combustion engine of the liquid fuel injection type, the combination with a cylinder, of means defining a combustion chamber communicating with said cylinder and forming the major portion of the compression space at the end of the compression stroke, said means comprising a structure providing a pocket having a mouth and a heat retaining plug disposed within the mouth, the internal surfaces of said pocket and mouth affording a substantially smooth uninterrupted contour, said plug being provided with a passage therein of substantial length through which the entire volume of burning gas flows during the working stroke from the combustion chamber into the cylinder bore and through which substantially the entire air charge is delivered and during the compression stroke caused to sweep about the internal surfaces only of said pocket and plug, and a fuel injection device delivering a jet of fuel so directed as to project substantially the whole of the fuel charge toward and with sufficient velocity to cause particles of fuel which may be unburned to impinge on a portion of the heated internal surface of said plug lying adjacent the passage and swept over by the circulating charge as it approaches the passage, said fuel injection device being disposed in the smooth contoured portion of the pocket generally opposite the plug, whereby the outer portion of the rotating air charge may sweep twice across the fuel jet in passing once about the pocket.

6. A method of effecting combustion in an internal combustion engine of the liquid fuel injection compression ignition type, which comprises the steps of forcing substantially the whole of the air charge into the combustion chamber during the compression stroke, supplying heat to the air charge during passage thereof into the combustion chamber, circulating the whole of the air charge about the chamber in a state of undivided, uninterrupted, and organized rotation and past the point of entry thereof into the chamber, supplying heat to the circulating air charge at a point closely adjacent to the point of entry of the air charge as the charge approaches the latter, delivering a jet of liquid fuel into the air charge toward and in close proximity to said last named point only to form at such last named point a completely inflammable mixture and to initiate combustion, whereby the whole of the air charge is caused to follow a path generally directed so as to intersect the fuel jet adjacent said last named point and in advance only, as regards direction of movement of the air charge, of the point of entry of the air charge, and discharging the resultant mixture from the combustion chamber at the said point of entry of the air charge without substantial heat loss.

7. A method of effecting combustion in an internal combustion engine of the liquid fuel injection compression ignition type which comprises the steps of forcing substantially the whole of the air charge into the combustion chamber during the compression stroke, supplying heat to the air charge during passage thereof into the combustion chamber, circulating the whole of the air charge about the chamber in a state of undivided, uninterrupted, and organized rotation and past the point of entry thereof into the chamber, supplying heat to the circulating air charge at a point closely adjacent to the point of entry of the air charge as the charge approaches the latter, delivering a jet of liquid fuel through the rotating air charge from a point remote from said last named point and toward and in close proximity to said last named point only to form at such last named point a completely inflammable mixture and to initiate combustion, whereby the whole of the air charge is caused to follow a path generally directed so as to intersect the fuel jet adjacent said remote point and adjacent said last named point and in advance only, as regards direction of movement of the air charge, of the point of entry of the air charge, and discharging the resultant mixture from the combustion chamber at the said point of entry of the air charge without substantial heat loss.

HARRY RALPH RICARDO.